July 23, 1935. G. A. CROFT 2,008,747
TOWING HITCH
Filed Sept. 24, 1931
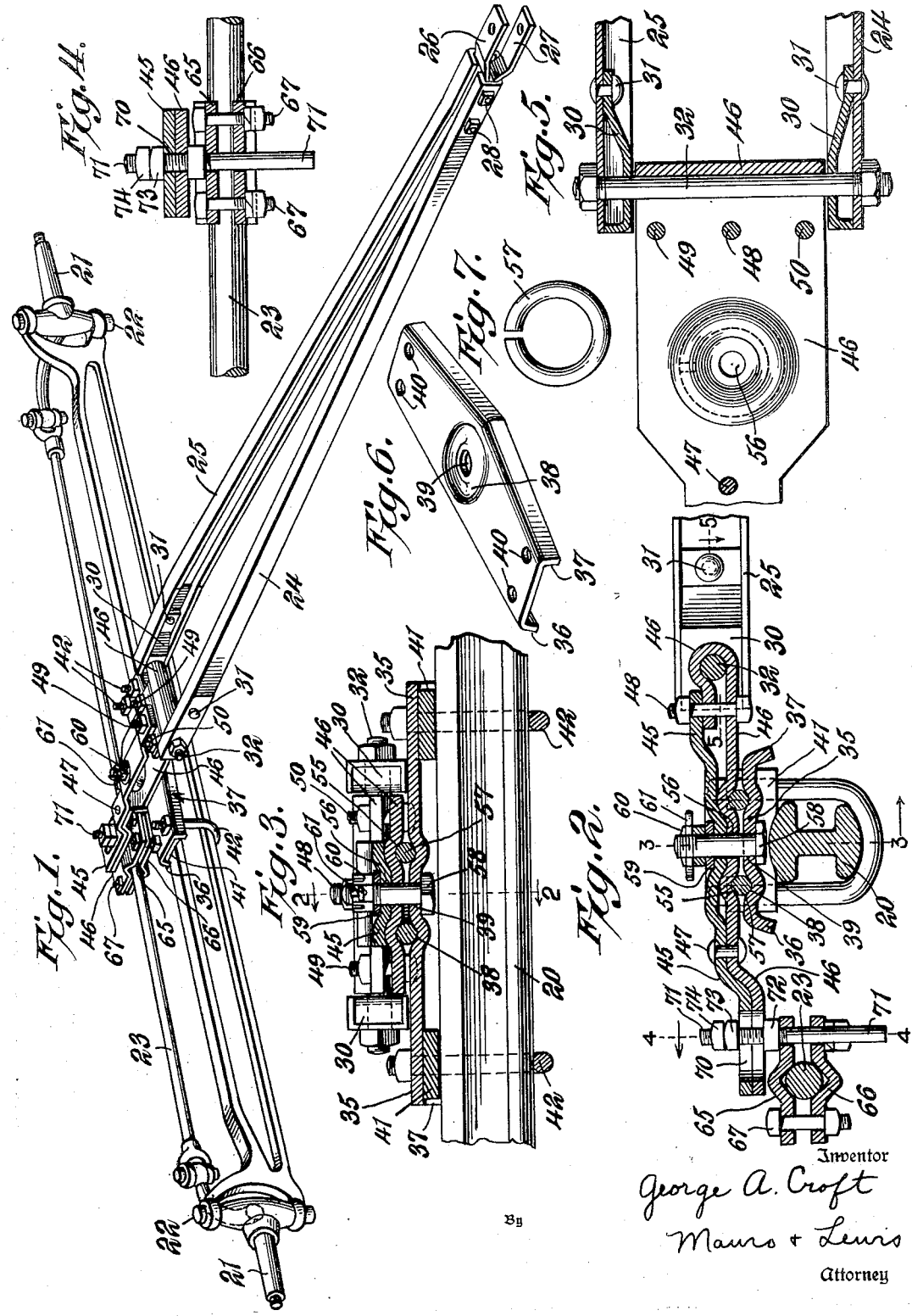
Inventor
George A. Croft
By Mauro + Lewis
Attorney Patented July 23, 1935

2,008,747

UNITED STATES PATENT OFFICE 2,008,747

TOWING HITCH

George A. Croft, Kansas City, Mo.

Application September 24, 1931, Serial No. 564,947

3 Claims. (Cl. 280—33.55)

This invention relates to towing connections, or what are commonly known as "hitches," especially designed for connecting an automobile, or tractor, at its rear end, to the forward end of another automobile, or to a four wheeled trailer, in a manner to tow the rear automobile or trailer, as well as to impart to the front wheels thereof steering movements in accordance with the direction, and changes of direction, of travel of the towing automobile.

Generally, the objects realized by the invention are the provision of a construction which is simple, constituted of relatively few parts, strong, rigid and durable, efficient and reliable in operation, adaptable and adjustable to standard types of automobiles, which may be readily and speedily applied and removed, and which is relatively inexpensive. Other more specific objects also realized by the invention will be apparent from the construction itself and some of them mentioned in the detailed description which follows.

One embodiment of the invention is illustrated in the accompanying drawing, wherein Fig. 1 is a perspective view showing the improved hitch joined to the front axle and steering connections of a vehicle to be towed;

Fig. 2 is a longitudinal vertical section lengthwise of the hitch as shown in Fig. 1 and on line 2—2 of Fig. 3;

Fig. 3 is a vertical section on line 3—3 of Fig. 2;

Fig. 4 is a detailed sectional view on line 4—4 of Fig. 2;

Fig. 5 is a detailed sectional view on line 5—5 of Fig. 2;

Fig. 6 is a perspective view of the fixed or base member of the turn table; and

Fig. 7 is a plan view of the ring of the turntable.

20 is the fixed front axle of the vehicle to be towed, having at opposite ends thereof the usual stub axles 21, 21 for the front wheels (not shown), said stub axles being swiveled on upright pivot pins 22, 22, and joined together by the usual connecting rod 23 of the steering mechanism.

The tongue of the hitch, or towing connection, comprises two metallic channel bars 24 and 25 with the channeled or grooved sides thereof facing towards each other. At the forward end of the tongue there is a coupling member consisting of a flat metal bar doubled upon itself, positioned for part of its length in the oppositely facing grooves of the bars 24 and 25, and providing two protecting arms 26 and 27 having holes therethrough in vertical alinement for a pivot bolt or member (not shown) for connecting the forward end of the tongue to the rear axle or other part of the automobile or tractor which is to do the towing. Bolts 28 secure the parts of the tongue together at the forward end thereof.

At the rear end of the tongue the bars 24 and 25 thereof are spread apart and provided, in the extreme end of the channel of each thereof, with a metallic filler member 30 held in place by a rivet 31. A bolt 32, screw threaded and carrying nuts at both ends thereof, passes through the bars 24 and 25 and the filler members 30, 30.

35 is the fixed or base member of a turn-table. It consists of an elongated plate of heavy sheet metal bent downwardly along both side edges thereof to constitute flanges 36 and 37 respectively and formed midway of its length with an annular groove or depression 38 concentric to an opening 39. Plate 35 is also provided with two bolt holes 40 at both ends thereof.

This base member 35 of the turn-table rests upon cross bars 41, 41 positioned transversely across the top of the axle 20 and is rigidly secured to said axle by U-bolts 42, 42, extending around the under side of the axle with their screw threaded ends passing upwardly through openings in the bars 41, 41 and through the openings 40 in the member 35 and engaged by nuts which are tightened to rigidly secure the parts together and in operative positions.

The rotating member of the turn-table is composed of two elongated plates 45 and 46 of sheet metal superimposed one upon the other except at their forward ends and secured together by a rivet 47; the rearward portions of the plates being of the same width, but the forward portion of the bottom plate 46 being considerably wider than the overlying portion of plate 45. The forward end of plate 46 bends upwardly and rearwardly around bolt 32 and terminates beneath the extreme forward end of plate 45 and a bolt 48 extends upwardly through both thicknesses of plate 46 and through the overhanging extremity of plate 45. Two other bolts 49 and 50 extend upwardly through the overlying portions of plate 46 beyond the side edges respectively of top plate 45, as best shown in Figs. 1 and 3. In the event of wear or other undesirable looseness in the hinge constituted by the end of plate 46 engaging around the hinge bolt 32, tightening of the nuts on bolts 49 and 50 will effect closer engagement of the plate around the bolt. At the same time, and for the same purpose, the nut on bolt 48 may be tightened. Undesirable movement of the plate 46 endwise of the hinge bolt, may also be remedied by tightening the nuts on the ends of bolt 32, drawing the bars 24 and 25 of the tongue closer together and the inner faces of the filler members 30, 30 closer to the opposite edges of plate 46.

The portion of plate 46 which overlies the base-member of plate 35 of the turn-table, has in its under face an annular groove or depression 55 concentric to an opening 56 through said plate 46 and also through plate 45. Said depression 55 is of the same dimensions as the depression 38 in plate 35 and is positioned opposite thereto, thereby providing an annular chamber approximately circular in cross-section and in which there is located a metal bearing ring 57 of corresponding dimensions and preferably of steel. A king-bolt 58, headed at its lower end, passes upwardly through the opening 39 in plate 35 and the opening 56 in plates 46 and 45, and at its upper end carries a washer 59 and a turret-nut 60. When nut 60 is adjusted to hold the parts assembled in the desired relationship, a key 61 (see Fig. 2) is inserted through notches of the turret-nut and through a perforation in the king-bolt 58, and the ends of the key are then spread apart in the usual way to prevent rotation of the nut. The space about the ring 57 is packed with grease, thereby facilitating free rotation of the rotating member of the turn-table on the ring as its bearing and providing a substantially anti-friction bearing.

It has been customary, in towing hitches on the market prior to the present invention, to rely upon the king-bolt alone as the connecting means for transmitting the pulling power to the vehicle being towed. But experience has demonstrated that the king-bolt and the openings through which it passes wear rapidly, producing looseness in the connections which is irremediable by adjustment and which greatly diminishes the efficiency and reliability of the entire apparatus, with the result and danger that the vehicle being towed not only fails to follow in the path of the towing vehicle, but may collide with other vehicles and even run off the road.

With the construction of the present invention the pulling and turning power and strains are transmitted mainly, if not entirely, through the bearing ring 57 of relatively large diameter and surface area; and there is little, if any, strain and wear upon the king-bolt and the walls of the opening through which it passes, its main function being to secure the parts together in properly assembled relationship. Furthermore, any undesirable looseness resulting from wear upon ring 57 and the annular depressions in which it engages, may be readily compensated for by adjustment; that is, by removing the key 61, tightening the nut 60 on the king-bolt 58 to force the plate 46 slightly toward the plate 35 and thereby into closer engagement with the bearing ring 57, and then replacing the key.

The connections to the steering mechanism of the vehicle being towed will now be described. Two plates 65 and 66, having oppositely positioned grooves engaging the connecting rod 23, are clamped in the desired position of adjustment on said rod by tightening bolts 67 passing through openings at the corners of said plates. At the rear end of plates 45 and 46, there is a vertical slot 70 (Fig. 2) through both plates and extending longitudinally thereof. The upper screw-threaded end of a rod 71 passes through said slot 70 and carries a nut 72 engaging the underside of plate 46, a nut 73 engaging the upper face of plate 45, and a lock nut 74. The rod 71 being adjusted and fixed in proper position in slot 70, its lower portion will engage freely through openings in both plates 65 and 66.

The operation of hitches of the general type illustrated and described, being well understood and obvious, description thereof is believed to be unnecessary. Suffice it to say that, when the steering mechanism of the vehicle to be towed is in good operating condition, the towed vehicle will be propelled and steered in a manner to accurately follow the path of the towing vehicle.

All of the parts are preferably made of steel, thereby dispensing with wood (sometimes used in prior hitches) which is subject to warping and decay. Furthermore, in the event of accident or wreck, the steel will bend without breaking and may be easily straightened or restored to its original shape. The hitch may be installed either on top of, or beneath, the front axle of practically all standard makes of automobiles or four wheeled trailers. The adjustability of the attachment to the connecting rod of the steering mechanism of the towed vehicle, accommodates the hitch to the particular location of said rod with relation to the front axle, which location or distance varies in different makes of vehicles which it may be desired to tow. The take-up adjustments for the hinge at the rear end of the tongue, and for the turn-table, provide for tightening in the event of wear, making it possible to have at all times a positively acting hitch. A worn or wobbly hitch will not cause the towed vehicle to follow the path of the towing vehicle. The turn-table with the relatively large bearing ring affords smooth and easy action and a long wearing bearing surface which relieves pull and consequent wear on the king-bolt and the walls of its openings. The tongue, constructed of two steel channel bars relatively wide apart at their rear ends, is of great strength.

What is claimed as new is:

1. A towing hitch, comprising in combination, a turn-table, including a base member, means for securing said base member to the vehicle to be towed, a rotatable member, a separate and removable annular bearing member between said base member and rotatable member and separating the same from engagement with each other, and means for securing said members together while permitting relative rotation thereof with said bearing member interposed; a tongue hinged to said rotatable member; and means for joining said rotatable member to the steering mechanism of the vehicle to be towed.

2. In a towing hitch, the combination of a turn-table comprising a base member, means for securing the same to the vehicle to be towed, a rotatable member, a king-pin passing through said members, and a separate and removable bearing ring between said members concentric to said king-pin and separating said members from engagement with each other; a tongue pivotally connected to said rotatable member; and means for joining said rotatable member to the steering mechanism of the vehicle to be towed.

3. In a towing hitch, a fifth wheel construction comprising upper and lower turntables, annular grooves formed in said turntables, king pin means for pivotally securing said turntables together, and a separate, removable annular bearing ring positioned in said grooves.

GEORGE A. CROFT.